W. K. HOWE.
SAFETY DEVICE FOR AUTOMATIC TRAIN CONTROL SYSTEMS.
APPLICATION FILED JULY 27, 1915.
1,291,523.
Patented Jan. 14, 1919.
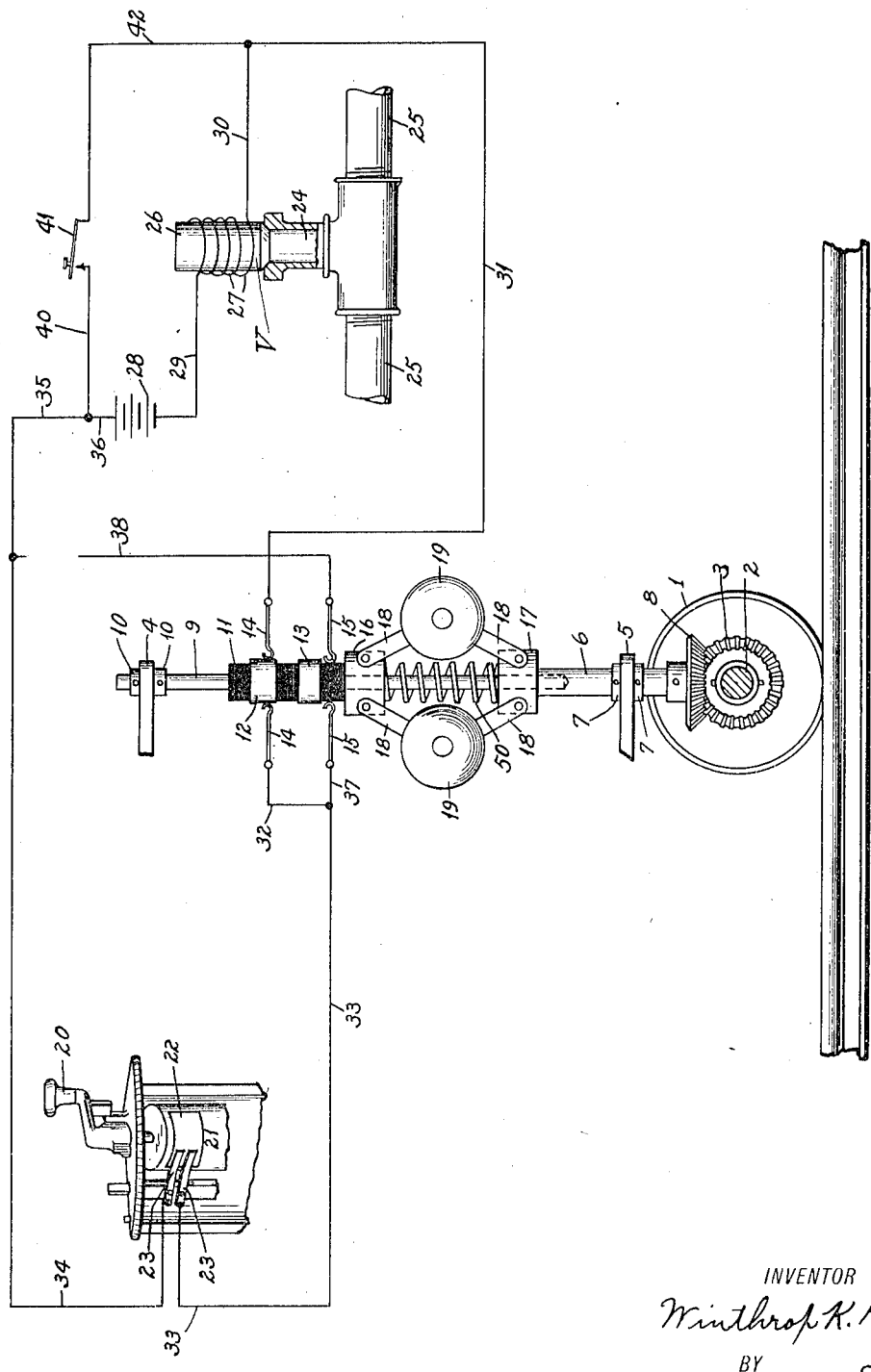
INVENTOR
Winthrop K. Howe
BY
Lyman E. Dodge
ATTORNEY

UNITED STATES PATENT OFFICE.

WINTHROP K. HOWE, OF ROCHESTER, NEW YORK, ASSIGNOR TO GENERAL RAILWAY SIGNAL COMPANY, OF GATES, NEW YORK, A CORPORATION OF NEW YORK.

SAFETY DEVICE FOR AUTOMATIC TRAIN-CONTROL SYSTEMS.

1,291,523.

Specification of Letters Patent. Patented Jan. 14, 1919.

Application filed July 27, 1915. Serial No. 42,167.

*To all whom it may concern:*

Be it known that I, WINTHROP K. HOWE, a citizen of the United States, and resident of the city of Rochester, in the county of Monroe and State of New York, have invented a new and useful Safety Device for Automatic Train-Control Systems, of which the following is a specification.

This invention relates to safety devices for automatic train control systems, and more particularly to safety devices for such systems which employ as a part of the controlling mechanism a speed indicating device operatively connected to the wheels of the train.

One of the principal objects of the invention is to provide a safety device for verifying the integrity of the operative connection between a speed indicating device carried on a railway vehicle and the wheels or axle of said vehicle, which safety device will automatically show when this operative connection between said speed indicating device and the wheels or axle of said vehicle is broken or inoperative for any reason.

A further object of the invention is to provide a safety device which will automatically apply the brakes on a vehicle whenever any of the mechanical parts connecting a speed indicating device carried by said vehicle and the wheels of said vehicle becomes broken.

Other objects and advantages will appear as the description of the invention progresses, and the novel features of the invention will be particularly pointed out in the appended claims.

Generally stated, the invention consists in providing a normally closed circuit for an alarm device or brake controlling mechanism which includes two partial circuits in parallel, one of said partial circuits being closed when the speed indicating device is operated to indicate a certain low speed, and the other partial circuit being closed when the vehicle is at rest but being opened after the controller for supplying power to the vehicle has been moved to a position sufficient to cause the vehicle to attain the above mentioned low speed.

The invention further consists in the parts, and in the arrangements and combinations of parts, more fully set forth hereinafter.

In describing the invention in detail, reference is had to the accompanying drawing, wherein I have illustrated a preferred physical embodiment of my invention, and wherein like characters of reference designate corresponding parts throughout the several views, and in which:

The figure shows diagrammatically one embodiment of the invention applied to an electrically propelled car, the parts being shown in the position which they assume when the car is at rest.

Referring to the accompanying drawing, only one wheel 1 and axle 2 of the car is shown, said axle 2 having a beveled gear 3 fixed thereto. Fixed in any suitable way to the frame of the car, not shown, are two supports 4 and 5; and in the lower support 5 is journaled a shaft 6 having two collars 7 pinned thereto, which are arranged one above and one below said support 5 and which serve to hold said shaft 6 in place. To the lower end of the shaft 6 is fixed beveled gear 8 which meshes with the beveled gear 3 secured to the car axle 2. Journaled in a recess in the upper end of the shaft 6 is a small shaft 9, the upper end of which is journaled in the upper support 4, and is provided with collars 10 pinned thereto and serving to prevent upward and downward movement of said small shaft. Slidably mounted on the small shaft 9 is a sleeve 11 of insulating material to which are secured two contact rings 12 and 13 respectively; and coöperating with these contact rings are two pairs of contact springs 14—14 and 15—15 respectively, supported in any suitable manner adjacent said sleeve 11. To the lower end of the sleeve 11 is secured a member 16, and to the upper end of the shaft 6 is secured a member 17; and to the member 16 and the member 17 are pivotally connected two pairs of pivoted links 18, each pair of which carries a ball weight 19. Encircling the shaft 9 and interposed between the members 16 and 17 is a compression coil spring 50.

The device for controlling the supply of power to the motors of the car is shown diagrammatically as a controller of a well known construction, having a handle 20 for operating the usual controller drum 21. This controller drum 21 has fixed thereto a contact strip 22, which coöperates with a pair of contact fingers 23 suitably supported adjacent thereto, said fingers 23 being in contact with the strip 22 while the controller handle 20 is in its "off" position and also in the first few power positions of said handle.

The speed indicating device is shown as arranged to control an electro-pneumatic valve V which is deënergized to cause an automatic application of the brakes of the car when the speed of the car exceeds a certain predetermined speed. This valve V may be of any suitable construction, but is illustrated as comprising a chamber 24 which communicates with the brake pipe 25 of the well known pneumatic system of railway brakes. The valve proper comprises a plunger 26 which is also the core of a coil or solenoid 27, and which is arranged to be pressed against its seat in chamber 24 when the coil 27 is energized.

Operation:—The parts of the safety device embodying the invention are shown in the position which they assume when the car is at rest. The controller contacts comprising the contact strip 22 and the contact fingers 23 are closed, the upper pair of contact springs 14—14 are in contact with the ring 12 of the sleeve 11, and the lower pair of contact springs 15—15 are not in contact with the ring 13, but are a short distance below said ring. With the parts in this position, the coil 27 of the electro-pneumatic valve V is energized from a local source of current, such as a battery 28, according to a circuit which may be traced as follows: battery 28, conductor 29, coil 27, conductors 30 and 31, contact spring 14, ring 12, contact spring 14, conductors 32 and 33, contact finger 23, contact strip 22, contact finger 23, and conductors 34, 35 and 36 back to the battery 28. When the controller handle 20 is moved to supply power to the motors of the car, for the first three or four power positions of the controller handle 20, the contact strip 22 and the contact finger 23 remain in contact. As soon as power is supplied to the motors of the car the wheels 1 thereof commence to turn, causing the shaft 6 to be driven by means of the meshing beveled gears 3 and 8, and when the shaft 6 revolves it carries with it the ball weights 19, which, due to the rapid rotation of said shaft, are thrown outwardly by centrifugal force to draw the sleeve 11 downwardly, in the same way as the well known ball governor operates. When the sleeve 11 has been drawn downwardly a short distance the pair of contact springs 15—15 makes electrical contact with the ring 13, thereby forming a shunt around the contact strip 22 and the contact fingers 23, and establishing another circuit for energizing the coil 27 of the electro-pneumatic valve V as follows: battery 28, conductor 29, coil 27, conductors 30 and 31, contact spring 14, ring 12, contact spring 14, conductors 32 and 37, contact spring 15, ring 13, contact spring 15, and conductors 38, 35 and 36 back to the battery 28. In this way, the coil 27 of the valve V will remain energized after the controller handle 20 has been moved to a position beyond the positions in which the contact fingers 23 engage the contact strip 22, providing the speed indicator has been operated to move the sleeve 11. The parts are so proportioned that the contact springs 15—15 will maintain electrical contact with the ring 13 for all speeds above a certain low speed up to the point in the movement of the sleeve 11 where the ring 12 breaks contact with the pair of contact springs 14, which occurs at a predetermined maximum speed at which it is desired to automatically apply the brakes. When the car exceeds this predetermined maximum speed and the ring 12 is out of contact with the contact springs 14, the supply of current supplied from the battery 28 to the coil 27 of the electro-pneumatic valve V is interrupted, and the air pressure in the train pipe 25 and in the chamber 24 raises the plunger 26 from its seat and permits a reduction of pressure in the train pipe 25 sufficient to cause automatic application of the brakes, as will be clearly understood by those skilled in the art of braking railway vehicles.

Assume that some part of the mechanical connection between the axle 2 of the car and the links 18 and the ball weights 19 is broken, so that said ball weights do not properly respond to the speed of the car. In this case, the sleeve 11 will remain in its lower normal position, with the contact springs 15—15 out of contact with the ring 13, and when the controller handle 20 is moved to a position where the contact fingers 23 do not engage the contact strip 22 the normally closed circuit through the coil 27 of the electro-pneumatic valve V will be broken and said valve will operate to apply the brakes automatically. If the mechanism connected between the axle of the car and the speed indicating device should break, in order to permit the car to proceed, it would be necessary to energize the coil 27 of the electro-pneumatic valve by a circuit which is not controlled by the movement of the sleeve 11 of said speed indicating device. A circuit for accomplishing this result is illustrated in the drawing, and comprises a key 41, which when closed completes a circuit for energizing the coil 27 as follows: battery 28, conductor 29, coil 27, conductors 30 and 42, key 41, and conductors 40 and 36 back to the battery 28. This key 41 may be located in some place where only authorized persons can gain access, or may be arranged in some way so that the motorman will not be able to close this key and thus interfere with the operation of the speed control apparatus without detection. The speed indicating device, with which the safety device hereinbefore described may be used, may control the speed of the car in some way other than that shown, and also instead of causing the application of the brakes when the mechanical connection between the axle and the speed indicating device is broken, the safety device may be arranged so as to give a warning signal or show in some other way that this mechanical connection is broken. If a locomotive is used instead of a motor car the contact fingers 23 and the contact strip 22 will be actuated by the usual throttle lever usually used to control a supply of power to steam locomotives. Electrically propelled cars sometimes have two controllers, one at each end of the car, and in such case it will be apparent to those skilled in the art that the contact fingers 23 of these two controllers may be connected in a series or in some other suitable manner so that the movement of either controller beyond a certain point will open the normally closed circuit for energizing the valve V.

Although I have particularly described the construction of one physical embodiment of my invention, and explained the operation and principle thereof; nevertheless, I desire to have it understood that the form selected is merely illustrative, but does not exhaust the possible physical embodiments of the idea of means underlying my invention.

What I claim as new and desire to secure by Letters Patent of the United States, is:

1. In a system for automatically controlling the speed of railway vehicles, in combination: a speed responsive device operatively connected to the wheels of a vehicle and driven thereby, automatic train controlling mechanism controlled by said speed responsive device, a pair of coöperating contacts operated by said speed responsive device and closed when it is operated to correspond with a predetermined low speed, a vehicle controller for controlling the supply of power to drive said vehicle, a pair of coöperating contacts operated by said controller and closed in the off and first few power positions of said controller, a normally closed circuit including two partial circuits in multiple, one of said two pairs of coöperating contacts being arranged in each of said partial circuits, and means controlled by said normally closed circuit and rendered active when deënergized.

2. In a system for automatically controlling the speed of railway vehicles, in combination: a speed responsive device operatively connected to the wheels of a vehicle and driven thereby, a vehicle controller for controlling the supply of power to drive said vehicle, two circuit controlling devices, one operated by said speed responsive device and the other by said vehicle controller, two partial circuits in parallel and each including one of said circuit controlling devices, the circuit controlling device operated by said speed responsive device being closed for a range of speeds above a predetermined low speed, the circuit controlling device operated by said vehicle controller being closed for the off and the first few power positions of said vehicle controller and being open for the other power positions, a normally closed circuit including said parallel partial circuits, and automatic brake controlling mechanism controlled by said normally closed circuit and rendered active when deënergized to cause application of the brakes of said vehicle.

3. In a system for automatically controlling the speed of railway vehicles, in combination: a speed responsive device operatively connected to the wheels of a vehicle and driven thereby, automatic train controlling mechanism controlled by said speed responsive device, means operated by said speed responsive device when the speed of the vehicle is less than a predetermined speed, a vehicle controller for controlling the supply of power to drive said vehicle, and means operated by said vehicle controller in its off position and in its first few power positions for preventing the operation of said first-mentioned means.

4. In a system for automatically controlling the speed of railway vehicles, in combination: a speed responsive device operatively connected to the wheels of a vehicle and driven thereby, automatic train controlling mechanism controlled by said speed responsive device, a pair of coöperating contacts operated by said speed responsive device and closed when said speed responsive device is operated corresponding to a predetermined low speed, a vehicle controller for controlling the supply of power to drive said vehicle, a pair of coöperating contacts operated by said controller and closed in the off and first few power positions of said controller, a normally closed circuit including two partial circuits in multiple, one of said two pairs of coöperating contacts being arranged in each of said partial circuits, an electro-pneumatic valve for controlling the brakes of said vehicle, said valve being normally energized and causing application of the brakes when deënergized, said valve being included in said normally closed circuit, and a circuit for energizing said electro-pneumatic valve independently of said normally closed circuit.

5. In an automatic train control system, a speed responsive device operatively connected to the wheels of a vehicle and driven thereby, a circuit controller closed by the speed responsive device when it responds to the movement of the vehicle, another circuit controller closed when the vehicle is at rest, and a safety device governed jointly by said circuit controllers and rendered active when neither one is closed.

6. In an automatic train control system, a speed responsive device operatively connected to the wheels of a vehicle and driven thereby, means independent of said device for determining when power is applied to place the vehicle in motion, a safety device, and means for rendering said safety device active when the speed responsive device fails to respond to the movement of the vehicle as determined by said means.

7. In an automatic train control system, means operatively connected to the wheels of a vehicle and caused to assume an operative condition when the vehicle is in motion, other independent means having an operative condition when the vehicle is at rest, and a safety device rendered active when neither of said means is in its operative condition.

8. In an automatic train control system, a movable element, means responding to movement of the vehicle for causing movement of said element when the vehicle is in motion, a safety device, a power controller for the vehicle, and means controlled jointly by said element and said power controller for rendering the safety device active when power is applied to propel the vehicle and said element fails to move.

9. In an automatic train control system, means governed by the rate of movement of a vehicle and normally having an operative condition when the vehicle is in motion, independent means having an operative condition when the vehicle is stationary, and automatic braking mechanism acting to apply the brakes on the vehicle when neither of said means is in its operative condition.

10. In an automatic train control system, means operatively connected to the wheels of a vehicle and normally assuming a predetermined active condition when the vehicle is in motion, separate means having a predetermined active condition only when the vehicle is at rest, a safety device tending to assume a danger indicating condition, and means controlled jointly by both of said means for preventing said safety device from assuming its danger indicating condition while either of said means is in its predetermined active condition.

11. In a system for automatically controlling railway vehicles, a movable element adapted to be driven by the wheels of the vehicle, a power controller, a circuit controller closed when the movable element is moved by the wheels of the vehicle, another circuit controller opened when the power controller is operated to supply power to propel the vehicle, a safety device, and a normally closed circuit for governing said device having two branches in multiple each including one of said circuit controllers, whereby said safety device will be operated when power is supplied to propel the vehicle and said movable element fails to move.

12. In a system for automatically controlling railway vehicles, train control apparatus including a driving connection to the wheels of the vehicle, and means for indicating when said driving connection is broken, said means responding jointly to the application of power to the vehicle and the changed condition of said apparatus incident to the action of the driving connection, whereby the application of power to set the vehicle into motion will give an indication of danger unless said train control apparatus properly responds to the movement of the wheels of the vehicle.

WINTHROP K. HOWE.